Figure 1:
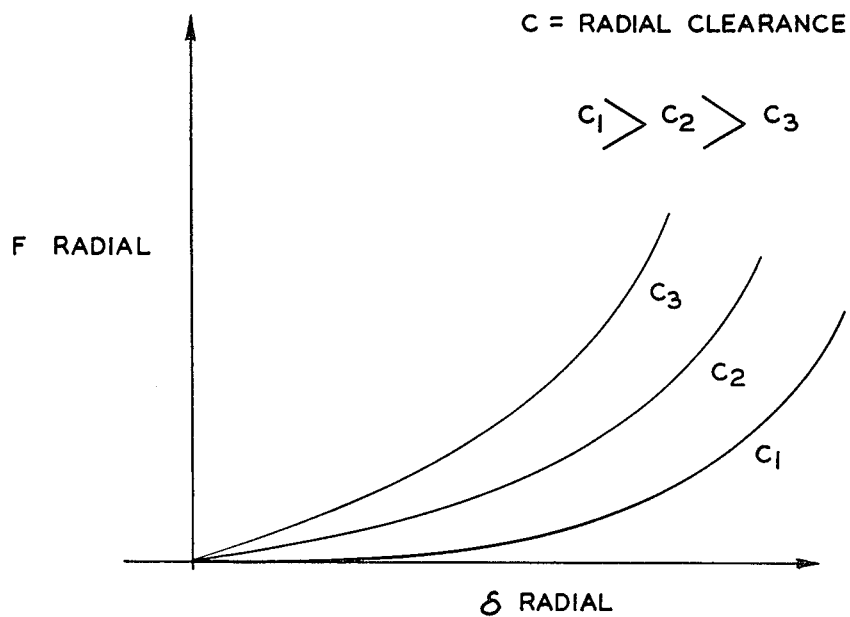

$\delta R$ = RADIAL DEFLECTION OF ROTOR AND GAS FILM DUE TO RADIAL LOAD ON BEARING ROTOR $\gamma$ = DISTANCE BETWEEN CENTER OF GRAVITY OF ROTOR & GEOMETRIC CENTER OF ROTOR $\omega$ = SPEED OF ROTATION OF ROTOR $FR$ = RADIAL LOAD ON BEARING ROTOR

INVENTOR.
LEONARD A. TRUGMAN
BY
ATTORNEY

United States Patent Office 3,242,721
Patented Mar. 29, 1966

3,242,721
METHOD OF MAKING A HYDRODYNAMIC GAS JOURNAL BEARING AND FOR DETERMINING THE FORCE DEFLECTION CHARACTERISTICS OF GAS BEARINGS
Leonard A. Trugman, Brooklyn, N.Y., assignor to The Bendix Corporation, Teterboro, N.J., a corporation of Delaware
Filed Sept. 3, 1963, Ser. No. 306,072
7 Claims. (Cl. 73—66)

The invention relates to a method of making a hydrodynamic gas journal bearing and for determining the force deflection characteristics of gas bearings and more particularly the invention relates to a method for providing an "adjustable spring rate" gas bearing of the hydrodynamic type and to a method for determining the radial force deflection characteristic of the fluid film journal bearing including gas bearings of the hydrostatic type as well as those of the hydrodynamic type.

An inherent characteristic of the hydrodynamic gas journal bearing is the development of a load carrying capacity in the gas bearing film due to a wedge effect on the gas caused by relative motion between rotor and stator elements of the bearing. The spring characteristic of this gas bearing film defines the static load carrying capacity of the bearing as well as the dynamic properties of the bearing, namely, the critical speed of the bearing (natural frequency or inversion speed) and the whirl-threshold speed of the bearing (speed instability).

An object of the invention is to provide a novel method for making a hydrodynamic gas journal bearing in which the dynamic unbalance inherent in the rotor or runner element of the bearing is utilized to load the bearing so as to avoid instability of operation of the bearing over a predetermined operating speed range and without the necessity of providing a secondary gas supply to load the bearing.

Another object of the invention is to provide a method for effecting stability of operation of a hydrodynamic gas journal bearing by preloading the bearing so as to exploit the dynamic unbalance thereof to effect stability of operation of the bearing within a predetermined speed range.

Another object of the invention is to provide a method of effecting stability of operation of a hydrodynamic gas journal bearing by so designing the bearing that the dynamic unbalance thereof will produce a gas bearing stiffness sufficient to assure stable operation thereof at speeds less than a predetermined speed.

Another object of the invention is to provide a method for designing a hydrodynamic gas journal bearing in which the unbalanced load (dynamic unbalance) of the rotor or runner element thereof is so arranged as to be high enough to assure stable operation, but low enough to prevent overloading of the bearing.

Another object of the invention is to provide a novel method for determining the radial force deflection characteristic of gas film bearings.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 2:
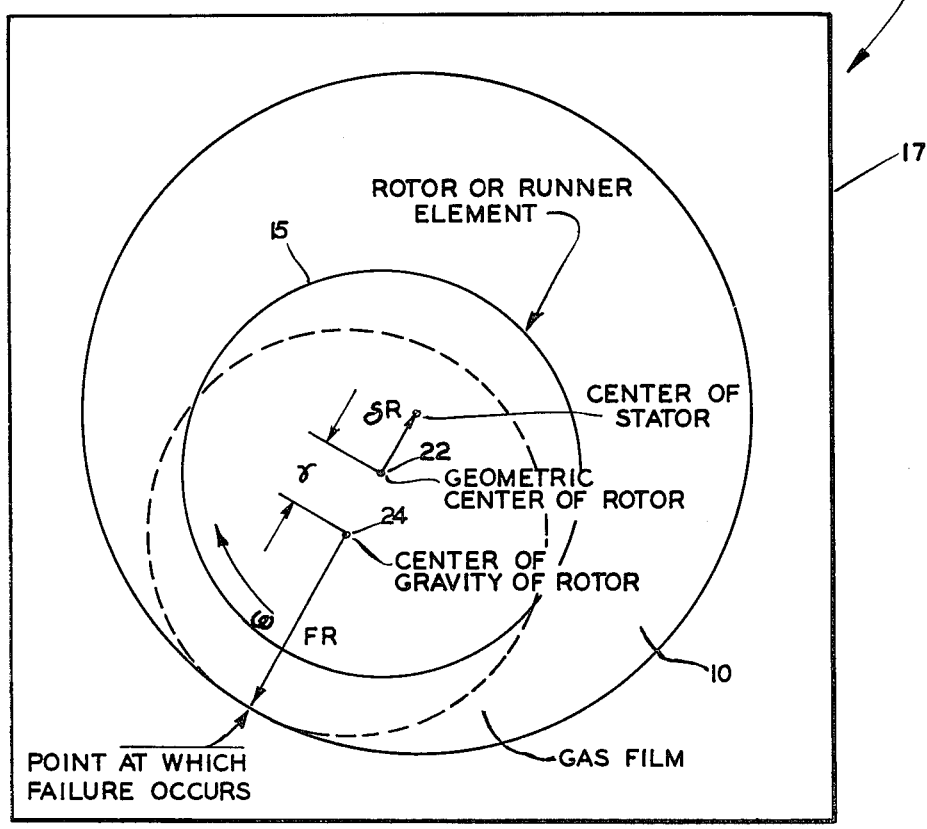

In the drawings:
FIGURE 1 is a graphical illustration of the force deflection characteristcis of hydrodynamic gas journal bearings with applicable formula.
FIGURE 2 is an exaggerated diagrammatic view of a hydrodynamic gas journal bearing illustrating the relationship of the stator element to the rotor or runner element and in which the geometric center and the gravitational center of the rotor element have been indicated thereon with the value or distance therebetween being shown in relation thereto.

The force deflection characteristic of a hydrodynamic journal gas bearing is shown graphically in the drawing of FIGURE 1 in which the significant conclusions to be derived from the graph and formula of FIGURE 1 are first, that gas bearings have no stiffness unless subjected to a load, and second, that the spring system of the subject gas journal bearing is highly nonlinear. This second conclusion then permits the stiffness of such gas bearings to be varied by merely changing the preload on the gas bearing thus providing an "adjustable spring rate" gas bearing.

The first conclusion is reached from the curves of the graph of FIGURE 1 showing the F Radial versus δ Radial characteristic of a hydrodynamic gas bearing. It may be observed that all of the curves of the graph of FIGURE 1 originate from the origin, i.e., zero radial load corresponds to zero radial deflection and vice versa.

The graph of FIGURE 1 may be considered in the light of the following formula:

$\delta R$=Radial deflection of rotor and gas film due to radial load $F_R$ on bearing rotor
$FR = A\delta_R{}^n$ where $n \approx 2.5$ and $A = f$
(Bearing parameters)
$\therefore K_R = dFR/d\delta R = nA\delta_R{}^{n-1}$ = radial spring rate The definition of $K_R$ (radial spring rate) is defined in the last formula from which it can be seen that if there is inserted a value of $\delta R = 0$, there is obtained zero radial spring rates. Therefore, zero force corresponds to zero spring rate, since zero force corresponds to zero deflection, as shown in the graph of FIGURE 1. Accordingly, gas bearings have no stiffness unless subject to radial load.

It is known that the whirl-threshold speed (speed instability) of the rotor or runner element occurs at $$\omega = 2\sqrt{\frac{k}{m}}\ \frac{\text{rad}}{\text{sec}}$$

where $k$ = bearing stiffness
$m$ = runner mass

Therefore, in order that successful operation of the gas bearing may be effected, it is necessary that the gaseous fluid bearing medium indicated in the drawing of FIGURE 2 by the numeral 10 between a rotor element 15 and a stator element 17 have sufficient stiffness to permit the operation of the bearing at speeds up to a predetermined whirl-threshold speed (instability speed) of the rotor element 15.

In any given bearing design, the above criterion will determine the minimum bearing stiffness ($k$ min) required for the bearing and therefore F radial min (minimum radial load on the bearing). This raises a question as to what is to be done for F radial in a zero $g$ environment. I have found that the solution to this problem is to preload the bearing by exploiting the dynamic unbalance of the rotor 15 in the rotor system (if standard machining methods do not incorporate sufficient unbalance into the rotor 15, an unbalance may be intentionally introduced into those surfaces of the rotor 15 which do not form the bearing surfaces).

Moreover, it has been found that in a rotor system, the rotor or runner element 15 will rotate about its geometric center 22 until a speed of rotation is reached which corresponds to the natural frequency of rotation of the system. This critical speed is also known as the inversion speed, since at speeds above it, the rotor or runner element has been found to invert or rotate about its mass center or center of gravity 24 instead of its geometric center. This inversion speed has been further found to equal one half the whirl-threshold speed (instability speed). For zero g applications, it is not sufficient to design a gas bearing having sufficient gas bearing stiffness so as not to execute a whirling motion (instability motion), since it has been found that the gas bearing will not have any stiffness once it passes through its natural frequency, since $K_R$ (radial stiffness)=0 unless $F_R$ (radial load) is present. Therefore, based upon $\omega$ operating speed, the $K_R$ min (minimum radial stiffness) is so determined that $\omega$ operating speed is less than $\omega$ critical speed. Thereafter, the force deflection characteristic of the bearing may be determined as hereinafter explained under the heading "Spring Characteristics of Gas Bearings" and knowing the spring characteristics of the bearing, the $F_R$ min (minimum radial load) is determined in order to obtain the $K_R$ min (minimum radial stiffness). The force due to unbalance in the rotor system is determined as follows:

$F_R$ (radial load) $=mr\omega^2=w/g\ r\omega^2$ where $m$=rotor mass=$w/g$
$r$=distance between center of gravity 24 and geometric center 22
$\omega$=speed of rotor 15

From a practical point of view, the designer should specify a range of static unbalanced torque so that $$\frac{F_R}{\omega^2/g}$$

min is less than T unbalance (unbalanced torque)=$Wr$ (rotor weight times distance between geometric and gravitational centers) and less than $$\frac{F_R}{\omega^2/g}$$

max. $F_R$ min is determined in accordance with $K_R$ min. $F_R$ max (maximum radial load) is determined so that an ample margin of safety is present in the bearing's load carrying capacity.

*Spring characteristics of gas bearings*

The spring characteristics of gas bearings may be determined through the following steps:

1. Determine residual machining unbalance of the rotor 15 T unbalance (unbalanced torque)=$wxr$ (rotor weight multiplied by distance $r$)
   ∴ $r$ is determined
2. Operate the rotor bearing up to speed at which it fails. Record speed (radians per second) at which failure occurs. By introducing sufficient unbalance in the rotor 15, failure of the bearing will be certain. (Rotor failure—means rotor 15 touches inner surface of stator 17 using up all radial clearance between rotor 15 and stator 17.)
3. $F_R$ (radial dynamic unbalance) at failure=$w/g(rw_f^2)$ ($w_f$ is the failure speed determined in step 2).
4. ∴ $F_R$ at $\delta_R$=radial clearance is determined. ($\delta_R$=radial deflection of rotor and gas film due to radial load on bearing.)
5. ∴ $A$ (a constant defining a specific bearing)=$F_R/\delta_R^n$ is determined.

where $n\approx2.5$ (factor found for hydrodynamic gas bearings)

and $n\approx1.0$ (factor found for hydrostatic gas bearings).

It follows then that the force deflection characteristic of the bearing may be determined and then utilized in the design of the hydrodynamic journal gas bearing as heretofore specified.

*Steps of method of making a hydrodynamic gas journal bearing*

With the foregoing in mind, the novel method herein provided for making a hydrodynamic gas journal bearing includes the following steps:

1. Determine $K_R$ min (minimum radial stiffness) required of the gas journal bearing based upon the operating speed of the bearing being less than $\sqrt{k/m}$ as previously defined.
2. Determine spring characteristic of the gas bearing by the steps previously described.
3. Therefore, as $K_R$(radial stiffness)=$nA\delta_R^{n-1}$ as set forth in FIGURE 1, there may be determined therefrom the required radial deflection of the motor 15 in order to develop the minimum required stiffness of the gas bearing as determined in step 1.
4. Using the value for radial deflection determined in step 3 and as set forth in FIGURE 1, there is determined $F_R=A\delta_R^n$, the minimum radial load required to be applied to the rotor 15 to develop the required gas film stiffness.
5. Since $F_R=w/g(rw^2)$ during normal operation of the bearing, there is determined the required value of $r$ to yield the required $F_R$ (radial load on the bearing).
6. Since $T$ unbalance=$W\times r$, there is determined the minimum unbalanced torque on the bearing rotor 15 in order to provide stable operation.
7. The rotor 15 is then machined so that the required torque unbalance is provided therein so as to assure stable operation of the bearing at speeds up to and inincluding operating speeds less than the natural frequency (critical or inversion speed).

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a method of making a hydrodynamic gas journal bearing having a rotor element and a stator element; comprising providing the rotor element with such a dynamic unbalance as to so radially load the bearing as to prevent instability of operation of the bearing over a predetermined operating speed range.

2. In a method for effecting stability of operation of a hydrodynamic gas journal bearing having a rotor element, comprising the steps of preloading the bearing so as to apply a dynamic unbalance to the rotor element of the bearing, and utilizing the dynamic unbalance resulting from the preloading thereof so as to effect stability of operation of the bearing within a predetermined speed range.

3. A method of effecting stability of operation of a hydrodynamic gas journal bearing having a rotor element, comprising dynamically unbalancing the rotor element of the bearing so as to produce a gas bearing stiffness sufficient to assure stable operation of the bearing at speeds less than a predetermined critical speed.

4. A method for effecting stability of operation of a hydrodynamic gas journal bearing having a rotor element and a stator element, the steps comprising applying an unbalanced load to the rotor element of the bearing, applying said load of a value sufficiently high as to assure stable operation of the rotor element in the stator element at speeds less than a predetermined critical speed, and applying said load of a value sufficiently low as to prevent an overloading of the rotor element of the bearing.

5. A method for effecting stability of operation of a hydrodynamic journal gas bearing having a rotor and a stator, the steps comprising determining the minimum radial stiffness required of the gas bearing upon the rotor rotating at a predetermined speed relative to the stator, determining spring characteristics of the gas bearing, determining the required radial deflection of the rotor in order to develop the minimum required stiffness of the gas bearing, determining the minimum radial load to be applied to the rotor to effect the radial deflection of the rotor in order to develop the minimum required stiffness of the gas bearing, determining the required value of the distance between the geometric center of the rotor and the center of gravity of the rotor to yield the required minimum radial load on the rotor, determining from the weight of the rotor and the distance between the geometric center and the center of gravity of the rotor the minimum unbalance torque to be applied to the rotor in order to provide stable operation thereof, and thereafter providing the rotor with the required torque unbalance to assure stable operation of the rotor in the stator element at speeds up to and including required operating speeds of less than the natural frequency of operation of the rotor.

6. The method defined by claim 5 in which the step of determining the spring characteristic of the gas bearing includes the steps of determining the residual unbalance of the rotor, operating the rotor bearing up to a speed at which the rotor fails by touching the inner surface of the stator, determining the radial unbalance of the rotor on the failure thereof, determining the radial load on the rotor at radial deflection of the rotor due to the radial load on the rotor, and therefrom determining the spring characteristics of the gas bearing.

7. A method for determining spring characteristics of a gas bearing having rotor and stator elements; comprising the steps of determining the residual unbalance of the rotor element, operating the rotor element up to a speed at which it fails by touching an inner surface of the stator element, determining the radial unbalance of the rotor element on the failure thereof, determining the radial load on the rotor element at radial deflection of the rotor element due to the radial load on the rotor element, and therefrom determining the spring characteristics of the gas bearing.

References Cited by the Examiner
UNITED STATES PATENTS
3,158,924  12/1964  Bowhill _____ 308—9 X RICHARD C. QUEISSER, *Primary Examiner.*

JAMES J. GILL, *Examiner.*